(12) United States Patent
Dimino et al.

(10) Patent No.: US 11,853,969 B2
(45) Date of Patent: Dec. 26, 2023

(54) MANAGING ARTIFACT INFORMATION, ESPECIALLY COMPARING AND MERGING ARTIFACT INFORMATION, METHOD AND SYSTEM

(71) Applicant: Siemens Industry Software GmbH, Zürich (CH)

(72) Inventors: Gerlando Dimino, Prague (CZ); Radomir Vencek, Dobříš (CZ); Miroslav Ruza, Prague (CZ)

(73) Assignee: SIEMENS INDUSTRY SOFTWARE GMBH, Zürich (CH)

( * ) Notice: Subject to any disclaimer, the term of this patent is extended or adjusted under 35 U.S.C. 154(b) by 115 days.

(21) Appl. No.: 17/872,196

(22) Filed: Jul. 25, 2022

(65) Prior Publication Data

US 2023/0109483 A1 Apr. 6, 2023

Related U.S. Application Data

(63) Continuation of application No. PCT/EP2021/076063, filed on Sep. 22, 2021.

(51) Int. Cl.
| | | |
|---|---|---|
| *G06Q 10/10* | (2023.01) | |
| *G06Q 10/101* | (2023.01) | |
| *G06F 18/22* | (2023.01) | |
| *G06F 40/30* | (2020.01) | |
| *G06F 40/166* | (2020.01) | |

(52) U.S. Cl.
CPC ........... *G06Q 10/101* (2013.01); *G06F 18/22* (2023.01); *G06F 40/30* (2020.01); *G06Q 10/10* (2013.01); *G06F 40/166* (2020.01)

(58) Field of Classification Search
None
See application file for complete search history.

(56) References Cited

U.S. PATENT DOCUMENTS

| | | | |
|---|---|---|---|
| 8,352,514 B2* | 1/2013 | Palaniappan | G06F 16/283 434/362 |
| 10,198,156 B2* | 2/2019 | Stefan | G06F 40/194 |
| 10,782,963 B2* | 9/2020 | Roh | G06F 8/71 |
| 2002/0198873 A1* | 12/2002 | Chu-Carroll | G06F 8/36 |
| 2006/0212843 A1* | 9/2006 | Zaky | G06F 8/20 717/106 |
| 2006/0265387 A1* | 11/2006 | Bhatkhande | G06F 9/44521 |
| 2018/0246869 A1 | 8/2018 | Stefan et al. | |
| 2019/0079758 A1 | 3/2019 | Roh et al. | |

OTHER PUBLICATIONS

PCT International Search Report and Written Opinion of International Searching Authority dated May 25, 2022, corresponding to PCT International Application No. PCT/EP2021/076063.

* cited by examiner

*Primary Examiner* — Maikhanh Nguyen
(74) *Attorney, Agent, or Firm* — Lempia Summerfield Katz LLC

(57) ABSTRACT

Systems and methods for improved management of artifact information of at least one first artifact document comprising a plurality of first fragments of artifact information and of at least one second artifact document comprising a plurality of second fragments of artifact information, especially comprising comparing and merging artifact information.

18 Claims, 4 Drawing Sheets

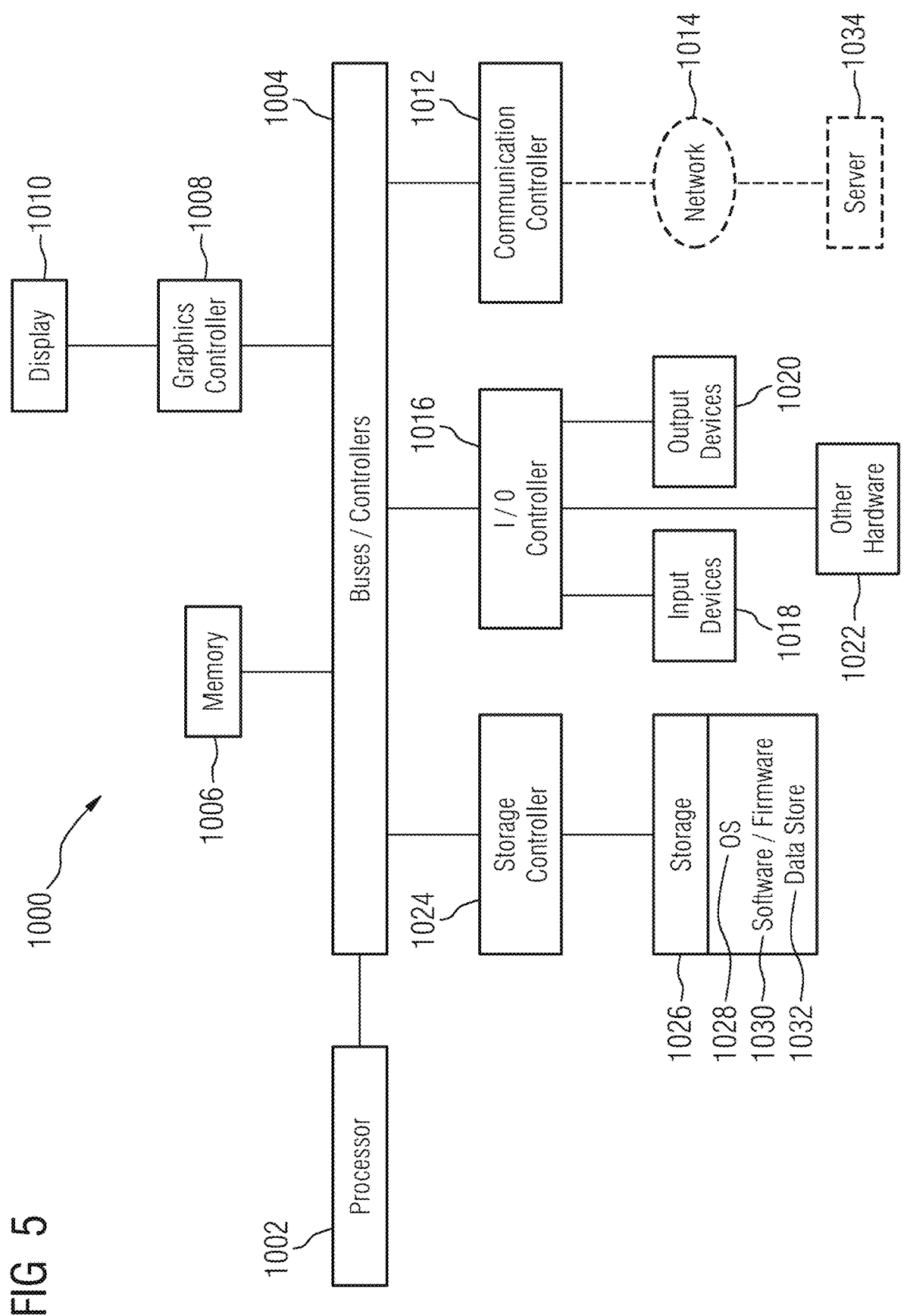

MANAGING ARTIFACT INFORMATION, ESPECIALLY COMPARING AND MERGING ARTIFACT INFORMATION, METHOD AND SYSTEM

CROSS REFERENCE TO RELATED APPLICATIONS

This application is a continuation under 37 C.F.R. § 1.53(b) of PCT PCT/EP2021/076063 filed on Sep. 22, 2021, which is hereby incorporated in its entirety by reference.

FIELD

Embodiments relate to product lifecycle management (PLM) systems, application lifecycle management (ALM) systems, for example for software, artifact information systems and similar systems, that are used to create, use, and manage data for products comprising software and artifacts and other items (collectively referred to herein as product systems).

BACKGROUND

Product systems may include stored content associated with products including software and artifacts and other items. Such content may involve comprehensive documentation and extensive artifact information which may be edited by several users.

Currently, there exist product systems and solutions which support managing artifact information. Such product systems may benefit from improvements.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Variously disclosed embodiments include data processing systems and methods that may be used to facilitate managing artifact information, especially comparing and merging artifact information.

According to a first aspect, a computer-implemented method is provided for managing artifact information of at least one first artifact document including a plurality of first fragments of artifact information and of at least one second artifact document including a plurality of second fragments of artifact information. The computer implemented method includes: determining a respective first similarity value between the respective first fragment and the respective second fragment; determining a respective second similarity value between the respective second fragment and the respective first fragment; determining a respective best-match pair of fragments among the respective first fragments and the respective second fragments based on the determined respective first similarity value and/or the respective second similarity value; determining at least one merge action available for merging the respective best-match pair; displaying the determined at least one merge action in an artifact information management user interface (UI); capturing a user's input corresponding to a selection of one of the displayed at least one merge action in response to user interactions with the artifact information management UI; and creating a respective amended first fragment of artifact information by merging the respective best-match pair according to the selected merge action.

According to a second aspect, a computer system may be arranged and configured to execute the steps of this computer-implemented method of managing artifact information. The described computer system may be arranged and configured to execute the following steps: determining a respective first similarity value between the respective first fragment and the respective second fragment; determining a respective second similarity value between the respective second fragment and the respective first fragment; determining a respective best-match pair of fragments among the respective first fragments and the respective second fragments based on the determined respective first similarity value and/or the respective second similarity value; determining at least one merge action available for merging the respective best-match pair; displaying the determined at least one merge action in an artifact information management user interface (UI); capturing a user's input corresponding to a selection of one of the displayed at least one merge action in response to user interactions with the artifact information management UI; creating a respective amended first fragment of artifact information by merging the respective best-match pair according to the selected merge action.

According to a third aspect, a computer program product may include computer program code which, when executed by a computer system, cause the computer system to carry out this computer-implemented method of managing artifact information.

According to a fourth aspect, a computer-readable medium may include computer program code which, when executed by a computer system, cause the computer system to carry out this computer-implemented method of managing artifact information. By way of example, the described computer-readable medium may be non-transitory and may further be a software component on a storage device.

The foregoing has outlined rather broadly the technical features of the present disclosure so that those skilled in the art may better understand the detailed description that follows. Additional features and advantages of the disclosure will be described hereinafter. Those skilled in the art will appreciate that they may readily use the conception and the specific embodiments disclosed as a basis for modifying or designing other structures for carrying out the same purposes of the present disclosure. Those skilled in the art will also realize that such equivalent constructions do not depart from the spirit and scope of the disclosure in its broadest form.

Also, before undertaking the detailed description below, it should be understood that various definitions for certain words and phrases are provided throughout this patent document and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

FIG. 5 depicts a block diagram of a data processing system according to an embodiment.

DETAILED DESCRIPTION

Figure 1:
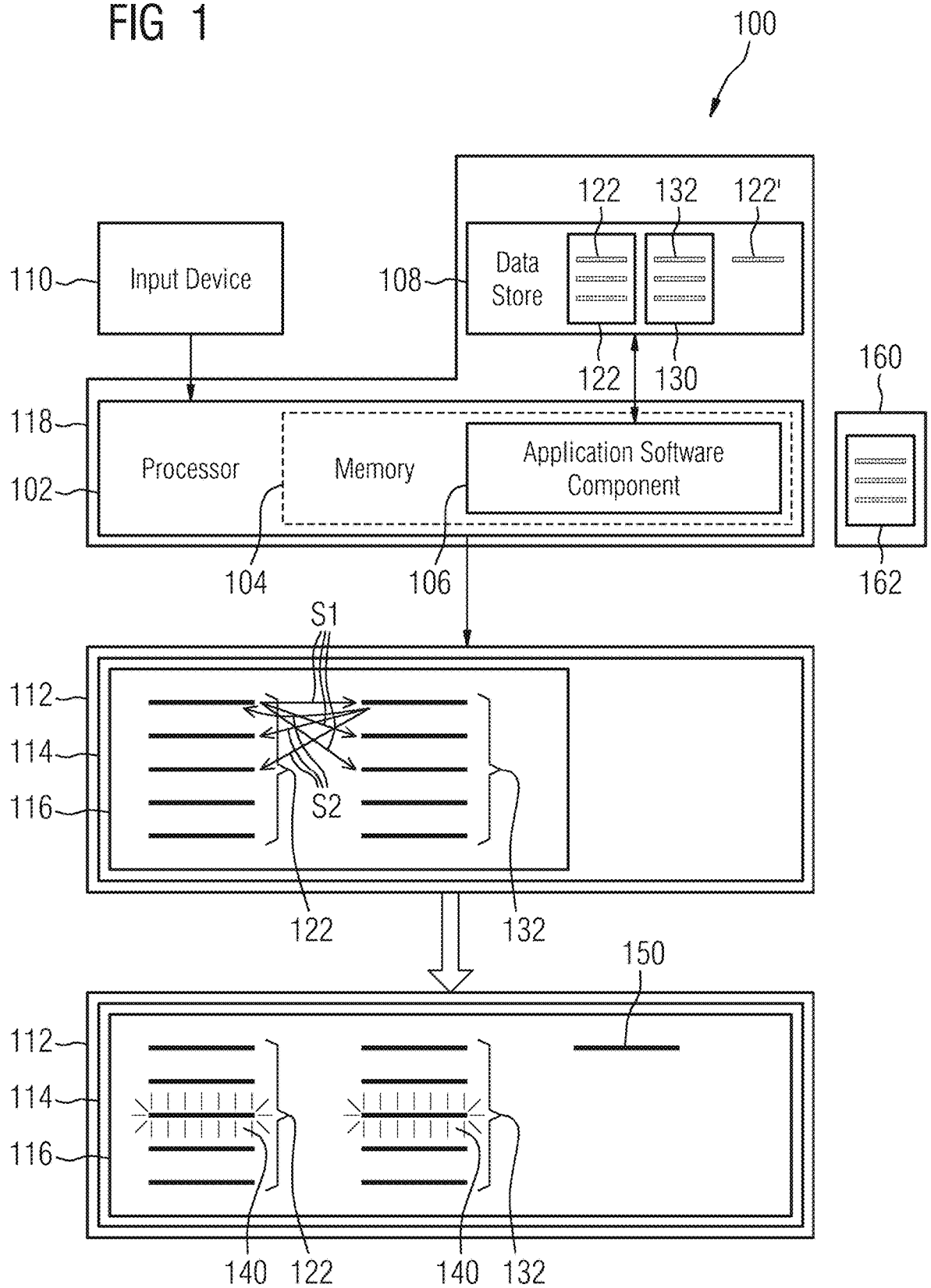
FIG. 1 depicts s a functional block diagram of an example system that facilitates managing artifact information in a product system according to an embodiment.

Various technologies that pertain to systems and methods for managing artifact information, comparing and merging artifact information, in a product system will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present patent document will be described with reference to exemplary non-limiting embodiments.

With reference to FIG. 1, a functional block diagram of an example data processing system 118 is illustrated that facilitates managing artifact information. The data processing system 118 may, in some examples, be an artifact information management system or more generally a computer system allowing for artifact information management by providing corresponding functionalities to a user. In the following, the data processing system 118 may be an artifact information management system 118, whereby is understood that other processing systems 118 including the functionalities of the artifact information management system 118 described herein may also be included by the artifact information management system 118. FIG. 1 further illustrates a larger data processing system 100 that includes the artifact information management system 118 and that may also be a computer system.

The artifact information management system 118 may include at least one processor 102 that is configured to execute at least one application software component 106 from a memory 104 accessed by the processor 102. The application software component 106 may be configured (i.e., programmed) to cause the processor 102 to carry out various acts and functions described herein. For example, the described application software component 106 may include and/or correspond to one or more components of PLM or ALM software application that is configured to generate and store product data in a data store 108 such as a database.

Examples of PLM systems that may be adapted to include the merging artifact information features described herein may include the Active Workspace features of Teamcenter, the NX suite of applications, Solid Edge, and/or LMS Imagine.LAB applications, all of which applications are produced by Siemens Industry Software Inc., of Plano, Texas, USA. Examples of ALM systems that may be adapted to include the merging artifact information features described herein may include Polarion ALM, an application produced by Siemens Industry Software GmbH, of Zurich, Switzerland. However, it should be appreciated that the systems and methods described herein may be used in other product systems (e.g., PLM, PDM, ALM systems) and/or any other type of system that generates and stores product data in a database. Also, examples of databases that may be used as one or more data stores described herein include database server applications such as Oracle, Microsoft SQL Server, or any other type of data store that is operative to store data records.

By way of example, the artifact information management system 118 may be cloud-based, internet-based and/or be operated by a provider providing artifact information management support, including, e.g., comparing and merging artifact information. The user may be located close to the artifact information management system 118 or remote to the artifact information management system 118, e.g., anywhere else, e.g., using a mobile device for connecting to the artifact information management system 118, e.g., via the internet, wherein the user's device may include an input device 110 and a display device 112. In some examples, the artifact information management system 118 may be installed and run on a user's device, such as a computer, laptop, pad, on-premises computing facility, or the like.

It should be appreciated that it may be difficult and time-consuming to manage artifact information (e.g., data records representing/storing data corresponding to parts, tools, documents, process descriptions, templates, materials, requirements specifications, software products, software applications) in complex, production PLM or ALM environments. For example, artifact information may be spread in several, if not many artifact documents, wherein these artifact documents may be large files including comprehensive artifact information. Such artifact information may, in some examples, be spread in several or many artifact documents since two or more users or group of users may work and edit their respective artifact document. There may, e.g., exist a master artifact document and one or several branch artifact documents, wherein two or more users or group of users may edit a respective branch artifact document and optionally also the master artifact document. It should be appreciated that identifying comparable elements or artifact fragments in the different artifact documents may be challenging, whereby comparable artifact fragments may then be merged into one artifact document, e.g., the master artifact document, if desired by the user(s). Managing artifact information, especially comparing and merging artifact information, of large and comprehensive artifact documents may require large computation or memory resources or—if these resources are not available—may be a slow and not efficient process or even fail.

To enable the enhanced management of artifact information of at least one first artifact document 120 including a plurality of first fragments 122 of artifact information and of at least one second artifact document 130 including a plurality of second fragments 132 of artifact information, the described processing system 118 or 100 may include at least one input device 110 and at least one display device 112 (such as a display screen). The described processor 102 may be configured to generate a graphical user interface (GUI) 114 through the display device 112. Such a GUI may include GUI elements such as buttons, links, search boxes, lists, text boxes, images, scroll bars) usable by a user to provide inputs through the input device 110 that cause managing artifact information.

In some examples, the artifact information of the respective first artifact document 120 and/or of respective the second artifact document 130 may include software documentation, software applications, complex data objects, work items, requirements, tasks, change requests, defects or test cases, source code of software products, images, videos, text, webpages, documentation, or any combination thereof. The artifact information may, e.g., be used in the context of (agile) software development. Such artifact information or fragments of it may, by way of example, further be included by one or several of the first fragments 122 and/or the second fragments 132. In some examples, the first fragments 122 and/or the second fragments 132 may include a respective fragment of such artifact information.

By way of example, the data processing system 118 and/or the application software component 106 may allow for artifact information management by providing corresponding functionalities to a user. Typically, there may be hundreds, thousands or even many more of such first fragments 122 and/or second fragments 132. In some examples, one or more user(s) may edit the respective first artifact document 120 or the second artifact document 130, e.g., by inserting, amending, moving and/or deleting artifact information, such as first fragments 122 and/or second fragments 132, included by the respective first artifact document 120 or the respective second artifact document 130.

In an example embodiment, the application software component 106 and/or the processor 102 may be configured to determine a respective first similarity value S1 between the respective first fragment 122 and the respective second fragment 132.

In some examples, the similarity value, here the first similarity value S1, may be understood as a similarity measure or similarity function that may be a real-valued function that quantifies the similarity between two objects, here between the respective first fragment 122 and the respective second fragment 132. The same may apply accordingly to the second similarity value S2. Sometimes, such similarity measures may in some sense be the inverse of distance metrics: they may take on large values for similar objects and either zero or a negative value for very dissimilar objects. In further examples, a cosine similarity may be used as a similarity measure for real-valued vectors, that may be known from (among other fields) information retrieval to score the similarity of documents, here between the respective first fragment 122 and the respective second fragment 132, in the vector space model. In machine learning, common kernel functions such as the radial basis function (RBF) kernel may be viewed as a similarity function. By way of example, the number or length of words or text (in the programming context: of strings) or letters (characters), the number or type of numbers (such as integer, floating-point numbers) and/or the number of Boolean data included by the respective first fragment 122 and/or the respective second fragment 132 may be taken into account for the determination of the respective similarity value S1, S2. In some examples, two fragments 122, 132 of same type (e.g., string) may be considered similar if the two fragments 122, 132 include a certain number of same textual words or letters that exceed a configurable threshold with respect to same textual words or letters.

By way of example, one of the first fragments 122 of the first artifact document 120 may be compared with one of the second fragments 132 of the second artifact document 130 to determine a respective first similarity value S1. Accordingly, the respective first similarity value S1 may indicate the similarity of a pair of a first fragment 122 and a second fragment 132. In some examples, many of the first fragments 122 may be compared one by one with many of the second fragments 132 to determine the respective first similarity value S1 for each pair of first fragment 122 and second fragment 132.

By way of example, the first artifact document 120 may be the master artifact document and/or (parts of it) be displayed on the left side of an artifact information management user interface (UI) 116 that may be included by the GUI 114. Further, the second artifact document 130 may be a branch artifact document and/or be (parts of it) be displayed on the right side of the artifact information management UI 116. Accordingly, determining the respective first similarity value S1 may correspond to compare (the respective first fragment 122) from the left to (the respective second fragment 132 from) the right.

In some examples, the determined, respective similarity value S1, S2 may be a percentage or a real number in the interval of 0 to 1. Further, if the determined, respective similarity value S1, S2 exceeds a certain similarity value threshold, the considered respective first fragment 122 and respective second fragment 132 may, by way of example, be identified as similar or comparable. Examples of such similarity value thresholds are provided below.

In some examples, the application software component 106 and/or the processor 102 may further be configured to determine a respective second similarity value S2 between the respective second fragment 132 and the respective first fragment 122.

By way of example, one of the second fragments 132 of the second artifact document 130 may be compared with one of the first fragments 122 of the first artifact document 120 to determine a respective second similarity value S2. Accordingly, the respective second similarity value S2 may indicate the similarity of a pair of a second fragment 132 and a first fragment 122. In some examples, many of the second fragments 132 may be compared one by one with many of the first fragments 122 to determine the respective second similarity value S2 for each pair of second fragment 132 and first fragment 122.

In the context of the above example with the master and branch artifact document and/or (parts of the respective) artifact document displayed on the left and right side of the artifact information management UI 116, determining the respective second similarity value S2 may correspond to compare (the respective second fragment 132) from the right to (the respective first fragment 122 from) the left.

In further examples, the application software component 106 and/or the processor 102 may further be configured to determining a respective best-match pair 140 of fragments 122, 132 among the respective first fragments 122 and the respective second fragments 132 based on the determined respective first similarity value S1 and/or the respective second similarity value S2.

It should be appreciated that a respective pair of fragments 122, 132 may generally be understood as a pair including one of the first fragments 122 and one of the second fragments 132. The determined respective first similarity value S1 and the respective second similarity value S1 for various pairs of one of the respective first fragments 122 and one of the respective second fragments 132 may then be used to determine a respective best-match pair 140 among the mentioned pairs. This determination may, by way of example, include comparing the determined first similarity value S1 and the determined second similarity value S2 of all pairs of first fragments 122 and second fragments 132 for which the first similarity value S1 and/or the second similarity value S2 has or have been determined. The respective best-match pair 140 may, e.g., be chosen to be the pair with the highest value of the first similarity value S1 and/or the second similarity value S2.

In some examples, the respective best-match pair 140 may be the pair among the considered pairs for which the respective first fragment 122 and the respective second fragment 132 are most similar to each other. Herein, the similarity may be measured with the respective similarity value S1, S2 as explained above.

It should be appreciated that in some examples, for the determination of the first similarity value S1 and the second similarity value S2 different first fragments 122 and/or different second fragments 132 may be considered.

By way of example, the application software component 106 and/or the processor 102 may further be configured to determine at least one merge action 150 available for merging the respective best-match pair 140. Herein, merging the respective best-match pair 140 may be understood as merging the respective first fragment 122 and the respective second fragment 132 of the respective best-match pair 140.

In some examples, the respective merge action 150 may be an "insert" merge action for which the second fragment 132 (or the first fragment 122) may be inserted as an additional fragment in the first artifact document 120 (or the second artifact document 130, respectively). In further examples, the respective merge action 150 may be a "replace" merge action for which the first fragment 122 (or the second fragment 132) may be replaced with the second fragment 132 (or the first fragment 122) in the first artifact document 120 (or the second artifact document 130, respectively). In some examples, the respective merge action 150 may be a "discard" merge action for which the second fragment 132 (or the first fragment 122) may discarded or ignored, i.e., the second fragment 132 (or the first fragment 122) may not be inserted as an additional fragment in the first artifact document 120 (or the second artifact document 130, respectively). By way of example, the respective merge action 150 may be a "reference" merge action for which the first fragment 122 (or the second fragment 132) may reference to the second fragment 132 (or the first fragment 122) in the second artifact document 130 (or the first artifact document 120, respectively). This reference merge action 150 may be a special type of insert merge action 150 for which a reference to the second fragment 132 (or the first fragment 122) of the best-match pair 140 included by the second artifact document 130 (or the first artifact document 120) is inserted as additional fragment into the first artifact document 120 (or the second artifact document 130, respectively). The reference merge action 150 may be helpful when, e.g., the first artifact document 120 is a master artifact document and the second artifact document 130 is a branch artifact document including more recent fragments 132 that shall be introduced or more generally merged into the master document. In the above, the alternative in parenthesis may relate to the case that the second artifact document 130 is the master document and the first artifact document 120 is the branch document. Further, the alternative without parenthesis may relate to the case that the first artifact document 120 is the master document and the second artifact document 130 is the branch document.

The mentioned referencing may, by way of example, be realized as a live reference or as a frozen reference. A live reference may be particularly useful for incorporating future additional amendments in the artifact information of a branch artifact document (e.g., new or amended second fragments 132 included by the second artifact document 130) into an updated and always up-to-date version of the master artifact document (e.g., the first artifact document 120). A frozen reference may be used for incorporating current amendments in the artifact information of a branch artifact document (e.g., second fragments 132 included by the second artifact document 130) into the master artifact document (e.g., the first artifact document 120). Future amendments of the branch document shall not automatically be incorporated into the master document.

In further examples, the at least one merge action 150 available to a user may depend on at least one of a user status, a user security, an authentication status an artifact document status, or any combination thereof. Correspondingly, only those merge actions 150 may be displayed that are available to a specific user. This may allow for a security concept that is adapted to different user groups, such as administrators having full permission, regular uses having restricted permission and guests having minimum permission to amend, and in particular to delete, artifact information of the considered artifact document 120, 130. The available merge actions 150 may only be available if the respective user has correctly authenticated that improves security of the respective handled artifact document 120, 130. The available merge actions 150 may only include predefined merge actions 150 that may, in some examples, depend on the artifact document status, so that, e.g., references are only allowed from a branch document to a master document and not vice versa.

In an example embodiment, the application software component 106 and/or the processor 102 may further be configured to display the determined at least one merge action 150 in the artifact information management UI 116. Further, the application software component 106 and/or the processor 102 may further be configured to capture a user's input corresponding to a selection of one of the displayed at least one merge action 150 in response to user interactions with the artifact information management UI 116.

Displaying the determined, respective merge action 150 in the artifact information management UI 116 may allow the user to get an overview of the available merge actions 150 for the respective best-match pair 140. The user may then select one of the displayed, available merge actions 150, e.g., by clicking on the desired displayed merge action 150. In some examples, the respective first fragment 122 and the respective second fragment 132 of the determined, respective best-match pair 140 may be displayed to the user along with the determined respective merge action 150.

In further examples, the application software component 106 and/or the processor 102 may further be configured to create a respective amended first fragment 122' of artifact information by merging the respective best-match pair 140 according to the selected merge action 150. For the creation of the respective amended first fragment 122', the respective first fragment 122 and the respective second fragment 132 of the respective best-match pair 140 may be merged according to the respective merge action 150 that has been selected by the user. The selected merge action 150 may, e.g., be one of the above-explained insert, replace, discard or reference merge actions 150. The respective first fragment 122 and the respective second fragment 132 of the respective best-match pair 140 are processed accordingly to create the respective amended first fragment 122'. For the example of the discard merge action 150, the respective amended first fragment 122' may be equal to the respective first fragment 122.

By way of example, the respective amended first fragment 122' may be stored in the data store 108. In further examples, the application software component 106 and/or the processor 102 may further be configured to merge the respective best-match pair 140 into the respective first artifact document 120 or the respective second artifact document 130. To this end, is some examples, the respective amended first fragment 122' may (additionally or alternatively) be stored in the master artifact document, e.g., the first artifact document 120. In these examples, the respective amended first fragment 122' may be stored in the vicinity of the respective first fragment 122 of the best-match pair 140, e.g., (for the replace or discard merge actions 150) at the same position of the respective first fragment 122 in the first artifact document 120 or, e.g., (for the insert and reference merge actions 150) at a position in the respective first artifact document 120 directly after (or before) the position of the respective first fragment 122. Herein, the same approach may be applied correspondingly if the second artifact document 130 is the master artifact document.

By way of example, the respective first fragment 122 and optionally the respective first artifact document 120 (or parts of it) may be displayed in a first box in the artifact information UI 116. Further, the respective second fragment 132 and optionally the respective second artifact document 130 (or parts of it) may be displayed in a second box in the artifact information UI 116. The available merge action 150 may, in some examples, be displayed in a third box, e.g., a merge bar, in the artifact information UI 116.

It should also be appreciated, that in some examples, the described determination of respective similarity values S1, S2 may be performed from top to bottom of the respective first or second artifact document 120, 130. This may, e.g., be imply that first, the respective first or second fragments 122, 132 positioned at the beginning of the respective first or second artifact document 120, 130 may be considered and then the following respective first or second fragments 122, 132 may be considered, and so on, until eventually, the last respective first or second fragments 122, 132 of the respective first or second artifact document 120, 130 may be considered. In further examples, if a respective best-match pair 140 has been identified and the next, respective best match pair 140 is to be determined, only those first or second fragments 122, 132 may be considered that are positioned below or after the respective first fragment 122 and/or the respective second fragment 132 of the last determined best-match pair 140. In other words, in some examples, first or second fragments 122, 132 above or before the respective first fragment 122 and the respective second fragment 132 of the last determined best-match pair 140 may no more be considered for determining the next best-match pair 140.

In further embodiments, respective first or second fragments 122, 132 that are included by the respective best-match pair 140 and that have been merged according to the selected merge action 150 may be displayed in a special manner in the artifact information management UI 116. The display in the special manner allows the user to get a quick overview of respective first or second fragments 122, 132 that have already been merged as part of a respective best-match pair 140. By way of example, the special manner may include displaying the mentioned respective first or second fragments 122, 132 differently than those respective first or second fragments 122, 132 that have not yet been merged as part of a respective best-match pair 140, e.g., in italics, in bold, underlined, struck out, in a different size or font or color. In some examples, specific colors may be used to identify respective first or second fragments 122, 132 that have already been merged as part of a respective best-match pair 140, e.g., different colors for the above-mentioned different merge actions 150 insert, replace, discard, reference. For example, red color may be used for removed first or second fragments 122, 132 (as a result of a replace or discard merge action 150 affecting the respective first or second fragment 122, 132 of the master artifact document and the branch artifact document, respectively), green color may be used for added first or second fragments 122, 132 or references to them (as a result of an insert or reference merge action 150), or the like, grey or black color may be used for unchanged first or second fragments 122, 132 (as a result of a discard merge action 150 that does not affect the respective first or second fragment 122, 132 of the master artifact document).

Further, in some examples, if the respective first fragment 122 is identical to the respective second fragment 132, no respective first or second similarity value S1, S2 may be determined. In such examples of identical first and second fragments 122, 132, the subsequent steps may (also) not be performed, such as determining a respective merge action 150 displaying the determined respective merge action 150 and creating the respective amended first fragment 122'. Hence, identical first and second fragments 122, 132 may no more be considered since they may be considered as trivial with respect to the determination of the first or second similarity value S1, S2 and/or for merging. In such a case of identical first and second fragments 122, 132, the respective first or second fragment 122, 132 of the master artifact document may simply be kept and—if applicable—the process may move one to the next first or second fragment 122, 132. By way of example, such identical first and second fragments 122, 132 may be displayed in the above-explained special manner in the artifact information management UI 116 like respective first or second fragments 122, 132 that are included by the respective best-match pair 140 and that have been merged according to the selected merge action 150.

In some examples, the respective first artifact document 120 and/or the respective second artifact document 130 include(s) at least one artifact sequence and the application software component 106 and/or the processor 102 may further be configured to fragment the respective artifact sequence into a plurality of respective first fragments 122 and/or respective second fragments 132, respectively.

It should be appreciated that the suggested approach offers several advantages. Using other artifact information management approaches, e.g., for comparing and merging artifact information, the underlying artifact documents may become too big and the comparison between two artifact documents sometimes never finishes. In such cases, the comparison may take more than one hour that is inacceptable for the user, or the computer carrying out the artifact information management runs out of memory.

Contrary to other approaches, the suggested approach may, in some examples, allow to compare artifact information documents (that may also be big and comprehensive artifact information documents) within only a few minutes that is still acceptable for a user. In some examples, this may be achieved by not doing a full comparison of two artifact information documents, but by rather using some heuristics to determine what could be compared and by avoiding implausible, unreasonable or "crazy" comparisons that require large computation or memory resources, but almost never succeed in identifying similar or comparable fragments in two different artifact information documents.

In further examples, the application software component 106 and/or the processor 102 may further be configured to identifying the respective pair of artifact fragments 122, 132 as the respective best-match pair 140 if the respective first similarity value S1 or the respective second similarity value S2 exceeds a given similarity value threshold, respectively.

In some examples, the similarity value threshold may be configurable, e.g., by the user. Further, several (different) similarity value thresholds may be used for different sorts of respective fragments 122, 132, such as 70% for textual data (e.g., strings in the programming context, e.g., words, letters), 75% for elements of a table (e.g., including strings, characters, integers, floating-point numbers and/or Boolean data), 70% for the header of a table, or in some examples 50% for all table data (including table elements and the table header). Herein, the various (different) similarity value thresholds may also be configurable.

Hence, the respective first similarity value S1 may be determined for a respective pair of one of the first fragments 122 and one of the second fragments 132, and this respective pair may be identified as the respective best-match pair 140 if the respective first similarity value S1 exceeds the explained similarity value threshold. The same may apply accordingly with respect to the respective second similarity value S2 for a respective pair of one of the second fragments 132 and one of the first fragments 122.

In some examples, if one such best-match pair 140 has been identified or determined, the procedure may continue with identifying or determining the next best-match pair 140, e.g., by considering other fragments 122, 132 as those that are included by the previous best-match pair(s) 140. In other words, once the best-match pair 140 has been determined, no further the determination of the respective first similarity value S1 (or of the respective second similarity value S2) may be performed for pairs of fragments including the first fragment 122 (or including the second fragment 132) that is included by the previous best-match pair(s) 140. This approach may help to speed up the management of artifact information, especially of comparing artifact fragments 122, 132 and identifying similar or comparable fragments 122, 132.

It should also be appreciated that in some examples, the application software component 106 and/or the processor 102 may further be configured to determine a respective first similarity value S1 between one of the plurality of first fragments 122 and a first number 134 of the second fragments 132 until the respective first similarity value S1 exceeds a given similarity value threshold; to determine the respective first number 134 of second fragments 132; to identify the respective pair of fragments 122, 132 with the respective first similarity value S1 exceeding the given similarity value threshold as a respective first-match pair 142 of fragments 122, 132; and to determine a respective second similarity value S2 between the second fragment 132 of the first-match pair 142 and a second number 124 of the first fragments 122.

According to this refined approach, one of the first fragments 122 is chosen and the respective first similarity value S1 is determined between the chosen first fragment 122 and a first number 134 of the second fragments 132. The respective first similarity value S1 may be determined for the first number 134 of pairs of fragments 122, 132 until the respective first similarity value S1 exceeds a given similarity value threshold that, in some examples, may correspond to the above-explained similarity value threshold. Herein, depending on the considered first fragment 122 and second fragments 132, the first number 134 may be rather small (e.g., only one so that the first considered pair of fragments 122, 132 has a sufficiently great first similarity value S1) or rather great (e.g., several dozens, hundreds, etc. so that many of the considered second fragments 132 are not similar or comparable to the considered first fragment 122 until a suitable second fragment 132 may be found).

Once the pair of the chosen first fragment 122 and the considered second fragments 132 has a sufficiently great first similarity value S1, the determination of respective first similarity values S1 for the chosen first fragment 122 may be stopped and the respective first number 134 may be determined. Herein, the respective first number 134 may be understood as the number of considered second fragments 132 until the pair of the chosen first fragment 122 and one of the second fragments 132 has a sufficiently great first similarity value S1. If no suitable second fragment 132 (e.g., only pairs of fragments with a too low respective first similarity value S1) may be found, the respective first number 134 may be understood as the number of considered pairs of fragments 122, 132 for the chosen first fragment 122. In some examples, the explained stop of the determination of respective first similarity values S1 may help to accelerate the comparison of the first fragments 122 with the second fragments 132 and vice versa and to accelerate the determination of the respective first similarity values S1.

The pair of the chosen first fragment 122 and the one second fragment 132 for which the corresponding first similarity value S1 exceeds the given similarity value threshold may be identified as the respective first-match pair 142. In the context of the above example with master and branch artifact document and/or (parts of the respective) artifact document displayed on the left and right side of the artifact information management UI 116, the determination of the respective first-match pair 142 may, in some examples, be performed from the left (i.e., the chosen first fragment 122) to the right (i.e., the second fragments 132).

Once the respective first-match pair 142 has been identified, the procedure may continue with determining the respective second similarity value S2, e.g., from the right (i.e., the second fragment 132 of the first-match pair 142) to the left (one or more of the first fragments 122). Herein, the second number 124 of the first fragments 122 is considered for determining the respective second similarity value S2.

It should be appreciated that in some examples, the second number 124 may equal the first number 134. Hence, once the first number 134 has been determined, the second number 124 may be set to equal the determined first number 134.

A corresponding approach may apply from the respective second artifact document 130 to the respective first artifact document 120. In some examples, the procedure may alternatively or additionally include determining the respective second similarity value S2 between one of the plurality of second fragments 132 and a third number of the first fragments 122 until the respective second similarity value S2 exceeds the given similarity value threshold; determining the respective third number of first fragments 122; identifying the respective pair of fragments 132, 122 with the respective second similarity value S2 exceeding the given similarity value threshold as a respective third-match pair of fragments 132, 122; and determining the respective first similarity value S1 between the first fragment 122 of the third-match pair and a fourth number of the second fragments 132.

In further examples, the application software component 106 and/or the processor 102 may further be configured to determine the respective second similarity value S2 between the second fragment 132 of the first-match pair 142 and the second number 124 of the first fragments 122 until the respective second similarity value S2 exceeds a given similarity value threshold; and to identify the pair of fragments 122, 132 with the respective second similarity value S2 exceeding the given similarity value threshold as the best-match pair 140 of fragments 122, 132.

In the context of the above example with master and branch artifact document and/or (parts of the respective) artifact document displayed on the left and right side of the artifact information management UI 116, the procedure may now continue with comparing, e.g., from the right (i.e., the second fragment 132 of the first-match pair 142) to the left (i.e., the first fragments 122). The respective second similarity value S2 may be determined between the second fragment 132 of the first-match pair 122 and the second number 124 of first fragments 122 until the respective second similarity value S2 exceeds a given similarity value threshold that may correspond to the above-explained similarity value threshold.

Once the pair of the second fragment 132 of the first-match pair 142 and one of the considered first fragments 122 has a sufficiently great second similarity value S2, the determination of respective second similarity values S2 for the mentioned second fragment 132 may be stopped. Optionally, the respective second number 124 may be determined. In some examples, the explained stop of the determination of respective second similarity values S2 may help to accelerate the comparison of the second fragments 122 with the first fragments 122 and vice versa and to accelerate the determination of the respective second similarity values S2.

In some examples, the procedure may alternatively or additionally include determining the respective first similarity value S1 between the first fragment 122 of the third-match pair and the first number 134 of the second fragments 132 until the respective first similarity value S1 exceeds a given similarity value threshold; and identifying the pair of fragments 132, 122 with the respective first similarity value S1 exceeding the given similarity value threshold as the best-match pair 140 of fragments 132, 122.

In some examples, the application software component 106 and/or the processor 102 may further be configured to set the second number 124 to be equal to the first number 134; and/or to stop to determine the respective first similarity value S1 or the respective second similarity value S2 if the first number 134 and/or the second number 124 exceed(s) a number threshold, respectively.

Herein, setting the second number 124 to be equal to the first number 134 may, in some examples, make sure that only the number of respective second similarity values S2 are determined that is at most equal to the number of respective first similarity values S1. This may help to accelerate the comparison of the first fragments 122 with the second fragments 132 and vice versa and to accelerate the determination of the respective similarity values S1, S2. Setting the second number 124 to be equal to the first number 134 may, for example, be applied when first comparing from the left to the right and then from the right to the left (e.g., in the context of the above-mentioned master and branch artifact documents). A corresponding approach may, e.g., be applied when first comparing from the right to the left and then from the light to the right.

Additionally, or alternatively, the number of considered pairs of fragments 122, 132 for determining the respective first similarity value S1 and/or for determining the respective second similarity value S2 may be capped. This may be achieved by stopping the determination of the respective first or second similarity value S1, S2, if the first number 134 and/or the second number 124 exceed(s) the number threshold. Herein, the first number 134 and/or the second number 124 may count the number of considered pairs of fragments 122, 132 for which the respective first similarity value S1 and/or for determining the respective second similarity value S2 has been determined. In further examples, the number threshold may be configurable and may depend on the size of the respective artifact document 120, 130 or the available with respect to computation resources and/or memory. Capping the number of considered pairs of fragments 122, 132 for determining the respective similarity values S1, S2 may also help to accelerate the comparison of the first fragments 122 with the second fragments 132 and vice versa and to accelerate the determination of the respective similarity values S1, S2.

By way of example, the mentioned number threshold may be configurable by the user via a corresponding user input, or the mentioned number threshold may be determined and fixed by the artifact information management system 118 that takes into account the load (e.g., the size of the respective artifact document 120, 130) and the available resources (e.g., the computation resources and/or memory of the artifact information management system 118). In further examples, the mentioned number threshold may be fixed during the processing of the suggested approach as explained above: e.g., the respective first similarity value S1 may be determined between one of the plurality of first fragments 122 and the first number 134 of the second fragments 132 until the respective first similarity value S1 exceeds a given similarity value threshold for a specific pair of the one first fragment 122 and one of the second fragments 132. Then, the first number 134 may be set as the number threshold and may be applied to the next (or all following) determination(s) of respective similarity value(s) S1, S2.

In some examples, the number threshold may be understood as a distance between the (respective position of the) fragments 122, 132 in the respective artifact document 120, 130 that may still be considered for the determination of the respective similarity value S1, S2. As explained, the distance between fragments may be a configurable threshold, e.g., by fixing the distance by starting at left until a match is found (the distance may then be from the top to the matching fragment) and by then applying found distance to right side. For example, first from the left to the right is processed and screened for matches. A match may, e.g., be found at seven fragments distance so that the number threshold may be set to seven. Then from right to the left is processed and screened for matches, wherein maximum seven fragments are considered. In some examples, if the number threshold has not yet been fixed, a default number threshold or default distance limit may be to only screen maximum on half of the respective artifact document 120, 130.

By way of example, if a best-match pair 140 cannot be found within the number threshold, this may indicate that the respective fragment 122, 132 has been removed or added (comparing the two artifact documents 120, 130).

It should also be appreciated that in some examples, a match might be found in a greater distance than the distance limit or the number threshold. Nonetheless, such amendments may be discarded or not be considered. In many examples, such remote matches occur only seldomly, but finding and identifying such remote matches may consume excessive resources, such as computation and memory resources, that is why they may be ignored for the sake of an overall improved processing efficiency and speed.

It should also be appreciated, that in some examples, the application software component 106 and/or the processor 102 may further be configured to determine a respective first similarity value S1 between one of the plurality of first fragments 122 and a first number 134 of the second fragments 132; and to stop to determine the respective first similarity value S1 between the one of the plurality of first fragments 122 and the first number 134 of the second fragments 132 if the respective first similarity value S1 exceeds a given similarity value threshold or if the first number 134 exceeds a number threshold. In further examples, the application software component 106 and/or the processor 102 may additionally or alternatively be configured to determine a respective second similarity value S2 between the one of the plurality of second fragments 132 and a second number 124 of the first fragments 122; and to stop to determine the respective second similarity value S2 between the one of the plurality of second fragments 132 and the second number 124 of the first fragments 122 if the respective second similarity value S2 exceeds the given similarity value threshold or if the second number 124 exceeds the number threshold.

According to this enhanced approach, one of the first fragments 122 is chosen and the respective first similarity value S1 is determined between the chosen first fragment 122 and a first number 134 of the second fragments 132. The determination of the respective first similarity value S1 may be stopped a) if the respective first similarity value S1 for one of the considered pairs of fragments 122, 132 exceeds a given similarity value threshold or b) if the first number 134 exceeds a number threshold. Herein, the given similarity value threshold may correspond to the above-explained similarity value threshold and the given number threshold may correspond to the above-explained number threshold that may be configurable, and that may depend on the size of the respective artifact document 120, 130 or the available with respect to computation resources and/or memory.

Hence, for both variants a) and b), the number of considered pairs of fragments 122, 132 for determining the respective first similarity value S1 may be capped that may contribute to accelerate the comparison of the first fragments 122 with the second fragments 132 and to accelerate the determination of the respective first similarity value S1.

The same considerations may apply for the determination of the respective second similarity value S2 that may be stopped a) if the respective second similarity value S2 for one of the considered pairs of fragments 132, 122 exceeds a given similarity value threshold or b) if the second number 124 exceeds a number threshold.

In some examples, the determination of the respective first similarity value S1 may be carried out as described above until case a) or b) applies, and then the determination of the respective second similarity value S2 may be carried out as described above until case a) or b) applies, and so on. Thus, there may be an alternation of determinations of the respective first similarity value S1 (until the respective determination is capped) and of the respective second similarity value S2 (until the respective determination is capped).

In further examples, the application software component 106 and/or the processor 102 may further be configured to identify the one of the plurality of first fragments 122 as unmatchable if the determined respective first similarity value S1 between the one of the plurality of first fragments 122 and the first number 134 of the second fragments 132 is at most the given similarity value threshold. In further examples, the application software component 106 and/or the processor 102 may additionally or alternatively be configured to identify the one of the plurality of second fragments 132 as unmatchable if the determined respective second similarity value S2 between the one of the plurality of second fragments 132 and the second number 124 of the first fragments 122 is at most the given similarity value threshold.

In some examples, the determination of the respective first similarity value S1 may lead to comparably low first similarity values S1 for the pairs of the one first fragment 122 on the one hand and the first number 134 of the second fragments 132 on the other hand. Then, the determination of the respective first similarity value S1 may be stopped for the one first fragment 122 and this one first fragment 122 may then be identified or flagged as unmatchable. Corresponding considerations may apply for the determination of the respective second similarity value S2 and the identification of unmatchable second fragments 132.

The identification of unmatchable fragments 122, 132 may help to accelerate the comparison of the first fragments 122 with the second fragments 132 and vice versa since the computation efforts for unmatchable fragments 122, 132 may, in some examples, be reduced significantly compared to other approaches. Hence this aspect may also contribute to accelerate the determination of the respective similarity values S1, S2.

By way of example, if a fragment 122, 132 is identified as unmatchable, this may indicate that the respective fragment 122, 132 has been removed or added (comparing the two artifact documents 120, 130).

In some examples, for the determination of the respective first similarity value S1 and/or the respective second similarity value S2, only first fragments 122 and/or second fragments 132 are considered that are not included by best-match pairs 140 of fragments 122, 132 and/or that are not identified as unmatchable.

The comparison of fragments 122, 132 and the determination of the respective similarity values S1, S2 may further be accelerated by considering only first fragments 122 and/or second fragments 132 which not (yet) included by best-match pairs 140 and/or that are not (yet) identified as unmatchable.

In some examples, the comparison of fragments 122, 132 and the determination of the respective similarity values S1, S2 may be done for the respective fragments 122, 132 of the respective artifact document 120, 130 from top to bottom. Once one of the fragments 122, 132 has been identified to be included by a best-match pair 140 or as unmatchable, the respective fragment 122, 132 may no longer be considered for the comparison of fragments 122, 132 and the determination of the respective similarity values S1, S2. Hence, in some examples, once the determination of the respective similarity value S1 or S2 is done for a specific first fragment 122 or second fragment 132, the determination may end with identifying the specific first fragment 122 or second fragment 132 as being included by a best-match pair 140 or as being unmatchable. This aspect may, in some examples, ensure that artifact documents 120, 130 may be compared and merged within a reasonably short time period that is still acceptable for a user.

In an example embodiment, the application software component 106 and/or the processor 102 may further be configured to determine identical first fragments 122 in the plurality of first fragments 122 and identical second fragments 132 in the plurality of second fragments 132; and to consider only a given number of maximum allowed repetitions of the identical first or second fragments 122, 132 for the determination of the respective first or second similarity value S1, S2 and the determination of the respective best-match pair 140 of fragments 122, 132.

In some examples, the first artifact document 120 may include two or more identical first fragments 122. Further, the second artifact document 130 may include two or more identical second fragments 132. To speed up the comparison of the fragments 122, 132, only a given number of maximum allowed repetitions of the identical first fragments 122 or second fragments 132 may be considered for the determination of the respective first or second similarity value S1, S2 and the determination of the respective best-match pair 140 of fragments 122, 132.

Herein, the given number of maximum allowed repetitions may be configurable, e.g., four by default, or only one or two. If the given number of maximum allowed repetitions is only one, then only one of the two or more repeated first or second fragments 122, 132 may be considered for the determination of the respective first or second similarity value S1, S2 and the determination of the respective best-match pair 140 of fragments 122, 132.

This aspect related to the given number of maximum allowed repetitions may, in some examples, help to avoid searching one specific fragment 122, 132 too many times and may hence speed up the comparison of fragments 122, 132 and the determination of the similarity values S1, S2.

In further examples, if the respective first fragment 122 or the respective second fragment 132 consists of an empty entry or blank lines, the respective fragment 122, 132 may be filtered out or ignored for the purposes of the determination of the respective first or second similarity value S1, S2 and the determination of the respective best-match pair 140 of fragments 122, 132.

In some examples, if the respective first artifact document 120 and/or the respective second artifact document 130 include(s) a table of artifact information, the application software component 106 and/or the processor 102 may further be configured to identify each element of the table of the respective first or second artifact document 120, 130 as a respective first fragment 122 or second fragment 132, respectively.

A table of artifact information that is included by the respective first artifact document 120 or the respective second artifact document 130 may, in some examples, be fragmented such that each element of the table is identified as a respective first or second fragment 122, 132, respectively. This aspect may, by way of example contribute to handle tables, especially large and complex tables, efficiently and avoid a very large fragments 122, 132 that might require large computation or memory resources for processing.

Further, as explained above, the similarity value threshold may be configured for tables, e.g., as follows: 75% for elements of a table (e.g., including strings, characters, integers, floating-point numbers and/or Boolean data), 70% for the header of a table, or in some examples 50% for all table data (including table elements and table header).

In further examples, if the respective first artifact document 120 and/or the respective second artifact document 130 include(s) a table of artifact information, the application software component 106 and/or the processor 102 may further be configured to assign a respective table identifier to the respective first or second fragments 122, 132 included by the table of the respective first or second artifact document 120, 130, respectively; and to consider only the first or second fragments 122, 132 with the table identifier for the determination of the respective first or second similarity value S1, S2 and the determination of the respective best-match pair 140.

In some examples, only one table identifier may be assigned to the respective fragments 122, 132 indicating the existence of one or more tables, in other examples, a respective unique table identifier may be assigned to the respective fragments 122, 132 for each table. In some examples, only those first or second fragments 122, 132 with the (same) table identifier may be considered for the determination of the respective first or second similarity value S1, S2 and the determination of the respective best-match pair 140. Since this may help to compare fragments 122, 132 that by their nature are more comparable to each other, the assignment and use of a respective table identifier may, in some examples, be understood as using heuristics to further improve the comparison of fragments 122, 132 and the determination of similarity values S1, S2.

In further examples, the respective table may be considered in more detail to further speed up the processing. For example, the row or column similarity of two tables may be taken into account by comparing two tables row by row and/or column by column. This may, in some examples, be supported in introducing and using respective column identifiers and/or row identifiers. Further, "colspan" and "rowspan" algorithms known in HTML (HyperText Markup Language) may be used to collapse a column or a row and display or consider only one entry for the comparison of fragments 122, 132 and the determination of similarity values S1, S2. Herein, "colspan" (or "rowspan") may allow a single table cell to span the width (or height) of more than one cell or column (or row). The explained aspects of considering the respective table in more detail may, by way of example, help to maintain the structure or characteristic of the respective table or more generally the respective artifact document 120, 130 and not to break the respective table or more generally the respective artifact document 120, 130.

In some examples, the one or more steps of the following approach for handling tables may be applied:

Each table is normalized, basically the table is converted into the expected html table definition to simplify the comparison: i.e., if the table contains only tr elements than they are put inside the tbody element. If there are duplicated tbody or thead elements they are grouped together respecting the order where they appeared. All the invalid data are collected in a special section.)

Compare the invalid data section or captions if any

For each row container (thead, tbody, tfoot) check whether the table has the same structure (same number of rows and for each row same column structure colspan and rowspan are considered too)

If the structures are not same, then the tables are expanded considering colspan and rowspan.

The max distance for a match is calculated as percentage of max number of rows (considering both tables) and a configurable matching range, with the constraint that if the result is less than 5 rows, then it will be set to half of rows plus one.

Let's call startIndex the row from where the match is sought.

For each row is got the best match from left table and best match from right table and based on the distance and the defined threshold if is defined what is the row that matches for similarity or equality.

Before to compare the matched row, we have to mark as added all the new rows from startIndex till to (matchIndex−1) or to remove all the new rows from startIndex till to (matchIndex−1) whether the best match is from left side or right side respectively.

All the not compared rows are compared till to the one which matches.

It should also be appreciated, that in some examples, if several of the first or second fragments 122, 132 are included by a first or second work item, respectively, the application software component 106 and/or the processor 102 may further be configured to assign a respective work item identifier to the respective first or second fragments 122, 132 included by the first or second requirements engineering work item, respectively; and to consider only the first or second fragments 122, 132 with the work item identifier for the determination of the respective first or second similarity value S1, S2 and the determination of the respective best-match pair 140.

In some examples, only one work item identifier may be assigned to the respective fragments 122, 132 indicating the existence of one or more work items, in other examples, a respective unique work item identifier may be assigned to the respective fragments 122, 132 for each work item. In some examples, only those first or second fragments 122, 132 with the (same) work item identifier may be considered for the determination of the respective first or second similarity value S1, S2 and the determination of the respective best-match pair 140. Since this may help to compare fragments 122, 132 that by their nature are more comparable to each other, the assignment and use of a respective work item identifier may, in some examples, be understood as using heuristics to further improve the comparison of fragments 122, 132 and the determination of similarity values S1, S2. Further, the use of the respective work item identifier may, by way of example, help to maintain the structure or nature of the respective work item or more generally the respective artifact document 120, 130 and not to break the respective work item or more generally the respective artifact document 120, 130.

In further examples, the respective work item may relate to or be a requirements engineering work item.

In further examples, if several of the first or second fragments 122, 132 are included by a first or second picture, respectively, the application software component 106 and/or the processor 102 may further be configured to assign a respective picture identifier to the respective first or second fragments 122, 132 included by the first or second picture, respectively; and to consider only the first or second fragments 122, 132 with the picture identifier for the determination of the respective first or second similarity value S1, S2 and the determination of the respective best-match pair 140.

In some examples, only one picture identifier may be assigned to the respective fragments 122, 132 indicating the existence of one or more pictures, in other examples, a respective unique picture identifier may be assigned to the respective fragments 122, 132 for each picture. In some examples, only those first or second fragments 122, 132 with the (same) picture identifier may be considered for the determination of the respective first or second similarity value S1, S2 and the determination of the respective best-match pair 140.

In further examples, the respective picture may be fragmented into respective first or second fragments 122, 132, wherein the size of the picture, a URL (Uniform Resource Locator (URL)) of the picture, if applicable the pixels of the respective picture or any combination thereof may be treated as textual (string) fragment 122, 132. Further, the fragmentation of the respective picture may include treating colors, included text or numbers of the respective picture or any combination thereof may be treated as textual (string) or numerical (integer, floating-point number) fragment 122, 132. Further, different picture styles may be identified and also be treated as a fragment 122, 132. In some examples, the respective picture or image may be treated as a real picture or image fragment.

Since the mentioned aspects related to pictures may help to compare fragments 122, 132 that by their nature are more comparable to each other, the assignment and use of a respective picture identifier may, in some examples, be understood as using heuristics to further improve the comparison of fragments 122, 132 and the determination of similarity values S1, S2. Further, the use of the respective picture identifier may, by way of example, help to maintain the structure or nature of the respective picture or more generally the respective artifact document 120, 130 and not to break the respective picture or more generally the respective artifact document 120, 130.

It should be appreciated that in some examples, the application software component 106 and/or the processor 102 may further be configured to determine the respective best-match pair 140 based on a maximum value of the respective first similarity value S1 and on a maximum value of the respective second similarity value S2 and/or to determine the respective best-match pair 140 based on a maximum value of the sum of the respective first similarity value S1 and the respective second similarity value S2.

In some examples, the exact match of the first fragment 122 with the second fragment 132 (or vice versa) is preferred. If such an exact match is not available, the closest pair of fragments 122, 132 with a sufficiently great similarity value S1, S2 may be chosen.

In yet further examples, the algorithm supporting the explained enhanced management of artifact information may receive all (document-like-editor) dle-parts, such as work items, tables, text structure (like paragraph, heading, . . . ), text, etc. Then the algorithm may classify and split all dle parts into fragments. If a dle-part contains one or more table elements, it may be split in more fragments and each of these fragments is added to the fragments list. If a fragment contains one or more table elements, it may be split in more fragments and each of these fragments is added to the fragments list. Then, each fragment may be indexed using only its textual content without any markup. The fragments that belong to same work item are identified by same work item id (identifier), so if a work item contains a table each resulting fragments from the split will have the same id. The other fragments don't have an id. There may, e.g., be three indexes: one for text parts, one for table parts and one for work item parts.

Further, in some examples, for each side (left and right, cf. above explanation in the context of master and branch documents), the best match is sought comparing each fragment:

if the fragment contains only white spaces or is repeated too much or is a special table containing work item fields the fragment is not considered.

If a non-exact match for work item is sought, then the nearest text match and table match are sought (providing the previous match distance)

The nearest match of them is good and may be accepted.

If the match satisfies the acceptance criteria (e.g., the similarity value threshold) then the match is returned, otherwise the next fragment is taken into account repeating the operations starting from the step (a).

In some examples, the nearest match found is good (from left or right). All the previous unmatched fragments are compared in sequence (e.g., in an iterative way are compared: all adjacent textual fragment, the single table elements). The comparison between the two matching fragments is done. Each compared part is added to the comparison result.

In some examples, the possible matches are: no match, exact match, tables are comparable, text is similar, work items are the same, work items are similar.

In further examples, two fragments of same type are similar if they contain a number of same textual words that exceed a configurable threshold. Two tables are comparable if the first row of both tables is similar and its whole textual content is similar. When a match is found, if its distance is greater than the provided one, then it is discarded (its state is set to no match). If the fragment to inspect has distance greater than the actual match distance, then the search is interrupted. In some examples, the DaisyDiff library may be used only to compare textual part between them or table cell content.

Further, the acceptance criteria may, e.g., include: A match is found (with a sufficiently great similarity value). The match is not too far—otherwise it is better to look for another correspondence, because it will be a high possibility that this one part was moved and so we could have high chance that the next left part will have a closest correspondence. This avoids having big removed and added parts as result.

As already mentioned above, the suggested approach may, in some examples, allow to compare artifact information documents (that may also be big and comprehensive artifact information documents) within only a few minutes that is still acceptable for a user. In some examples, this may be achieved by not doing a full comparison of two artifact information documents, but by rather using some heuristics to determine what could be compared and by avoiding implausible, unreasonable, or "crazy" comparisons that require large computation or memory resources, but almost never succeed in identifying similar or comparable fragments in two different artifact information documents. Therefore, the suggested approach may help to speed up the management of artifact information, especially of comparing artifact fragments 122, 132, identifying similar or comparable fragments 122, 132 and merging similar or comparable fragments 122, 132.

In some examples, the first fragments 122 and the second fragments 132 (or at least some of them) may be displayed in the artifact information management UI 116, as illustrated in FIG. 1. In some examples, the first fragments 122 and the second fragments 132 along with the determined, respective first or the second similarity values S1, S2 may be displayed in the artifact information management UI 116. Both aspects may, however, be considered optional. Further, optionally, the best-match pair 140 may be displayed in the artifact information management UI 116.

It should be appreciated that the described the application software component 106 and/or the processor 102 may carry out an analogous method of managing artifact information, especially of comparing and merging artifact information.

Further, a computer-readable medium 160 that may include a computer program product 162 is shown in FIG. 1, wherein the computer program product 162 may be encoded with executable instructions, that when executed, cause the computer system 100 or and/or the artifact information management system 118 to carry out the described method.

Figure 2:
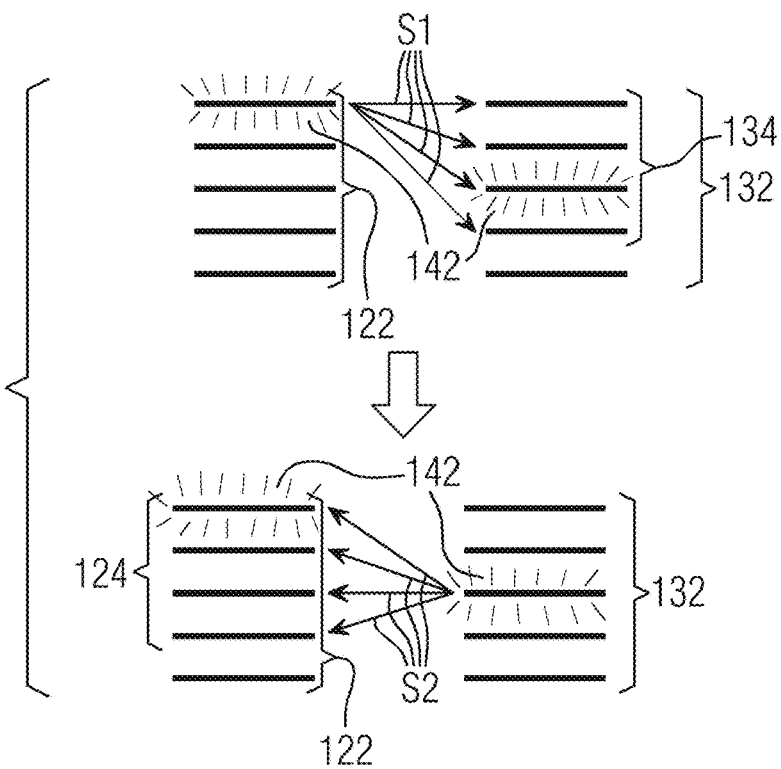
FIGS. 2-4 depict a flow diagram of an example methodology that facilitates managing artifact information in a product system according to an embodiment.

Referring now to FIG. 2, a flow diagram of an example methodology that facilitates managing artifact information in a product system is illustrated.

First, the respective first similarity value S1 between one of the plurality of first fragments 122 (highlighted in FIG. 2) and a first number 134 of the second fragments 132 may be determined until the respective first similarity value S1 exceeds a given similarity value threshold. Then, the respective first number 134 of second fragments 132 may be determined. Then, the pair of fragments 122, 132 with the respective first similarity value S1 exceeding the given similarity value threshold may be identified as a first-match pair 142 (highlighted in FIG. 2) of fragments 122, 132.

In a next step, the respective second similarity value S2 between the second fragment 132 (highlighted in FIG. 2) of the first-match pair 142 and the second number 124 of the first fragments 122 may be determined until the respective second similarity value S2 exceeds a given similarity value threshold. Then, the pair of fragments 122, 132 with the respective second similarity value S2 exceeding the given similarity value threshold may be identified as the best-match pair 140 (not shown in FIG. 2) of fragments 122, 132.

Figure 3:
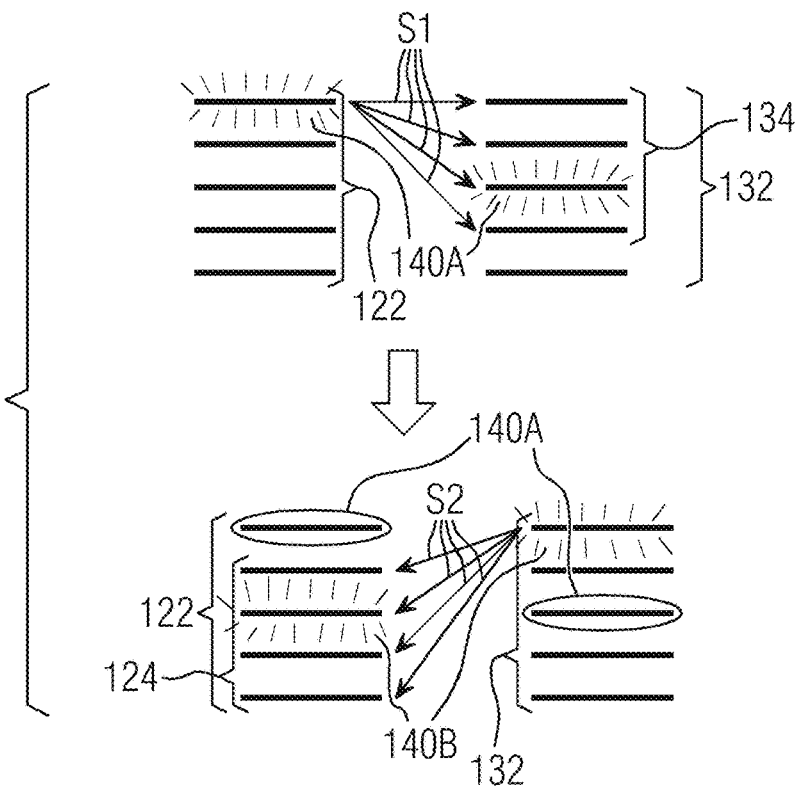

Referring now to FIG. 3, another flow diagram of an example methodology that facilitates managing artifact information in a product system is illustrated.

First, a respective first similarity value S1 between one of the plurality of first fragments 122 (highlighted in the upper half of FIG. 3) and a first number 134 of the second fragments 132 may be determined. This determination of the respective first similarity value S1 between the one of the plurality of first fragments 122 and the first number 134 of the second fragments 132 may be stopped if the respective first similarity value S1 exceeds a given similarity value threshold or if the first number 134 exceeds a number threshold.

If the respective first similarity value S1 exceeds a given similarity value threshold, a best-match pair 140A may be identified including the one first fragment 122 and a suitable second fragment 132 (both highlighted in the upper half of in FIG. 3) among the considered second fragments 132. If no suitable pair of fragments 122, 132 may be found (and the respective first similarity value S1 is too low), the first number 134 would exceed the number threshold and the determination of the first similarity value S1 for the one first fragment 122 may be stopped. In this case, the one first fragment 122 may then be identified as unmatchable.

In a next step, a respective second similarity value S2 between one of the plurality of second fragments 132 (highlighted in the lower half of FIG. 3) and a second number 124 of the first fragments 122 may be determined. This determination of the respective second similarity value S2 between the one of the plurality of second fragments 132 and the second number 124 of the first fragments 122 may be stopped if the respective second similarity value S2 exceeds a given similarity value threshold or if the second number 124 exceeds a number threshold.

If the respective second similarity value S2 exceeds a given similarity value threshold, another best-match pair 140B may be identified including the one second fragment 132 and a suitable first fragment 122 (both highlighted in the lower half of in FIG. 3) among the considered second fragments 122. If no suitable pair of fragments 132, 122 may be found (and the respective second similarity value S2 is too low), the second number 124 would exceed the number threshold and the determination of the second similarity value S2 for the one second fragment 132 may be stopped. The one second fragment 132 may then be identified as unmatchable.

In some examples, only first fragments 122 and second fragments 132 may be considered for the determination of the respective first similarity value S1 or the respective second similarity value S2 that are not (yet) included by best-match pairs 140A (highlighted in lower half of FIG. 3), 140B or that are not (yet) identified as unmatchable.

Figure 4:
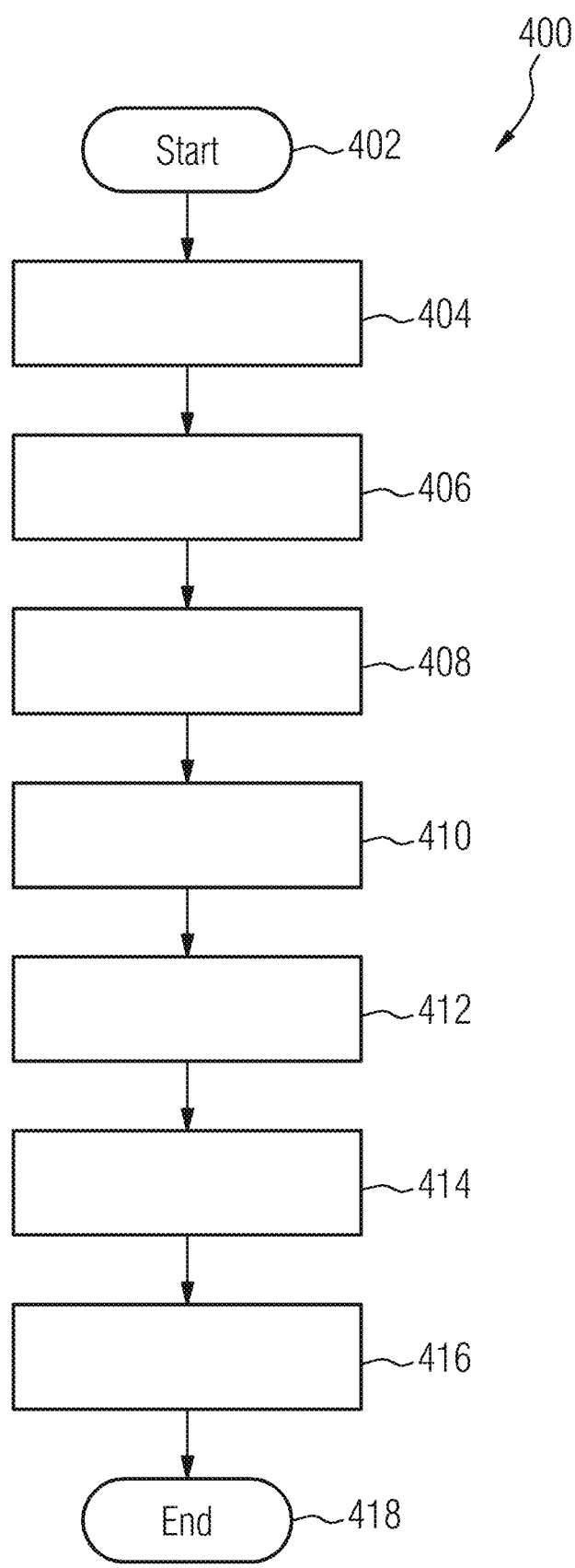

Referring now to FIG. 4, a methodology 400 that facilitates managing artifact information, such as comparing and merging artifact information, is illustrated. The method may start at 402 and the methodology may include several acts carried out through operation of at least one processor.

These acts may include an act 404 of determining a respective first similarity value between the respective first fragment and the respective second fragment; an act 406 of determining a respective second similarity value between the respective second fragment and the respective first fragment; an act 408 of determining a respective best-match pair of fragments among the respective first fragments and the respective second fragments based on the determined respective first similarity value and/or the respective second similarity value; an act 410 of determining at least one merge action available for merging the respective best-match pair; an act 412 of displaying the determined at least one merge action in an artifact information management user interface (UI); an act of 414 of capturing a user's input corresponding to a selection of one of the displayed at least one merge action in response to user interactions with the artifact information management UI; and an act of 416 of creating a respective amended first fragment of artifact information by merging the respective best-match pair according to the selected merge action. At 418 the methodology may end.

It should further be appreciated that the methodology 400 may include other acts and features discussed previously with respect to the computer-implemented method of managing artifact information, especially of comparing and merging artifact information.

For example, the methodology may further include the acts of identifying the respective pair of artifact fragments as the respective best-match pair if the respective first similarity value or the respective second similarity value exceeds a given similarity value threshold, respectively.

In further examples, the methodology may further include the acts of determining a respective first similarity value between one of the plurality of first fragments and a first number of the second fragments until the respective first similarity value exceeds a given similarity value threshold; determining the respective first number of second fragments; identifying the respective pair of fragments with the respective first similarity value exceeding the given similarity value threshold as a respective first-match pair of fragments; and determining a respective second similarity value between the second fragment of the first-match pair and a second number of the first fragments.

Is should also be appreciated that in some examples, the methodology may further include the acts of determining the respective second similarity value between the second fragment of the first-match pair and the second number of the first fragments until the respective second similarity value exceeds a given similarity value threshold; and identifying the pair of fragments with the respective second similarity value exceeding the given similarity value threshold as the best-match pair of fragments.

For example, the methodology may further include the acts of setting the second number to be equal to the first number; and/or of stopping to determining the respective first similarity value or the respective second similarity value if the first number and/or the second number exceed(s) a number threshold, respectively.

In further examples, the methodology may further include the acts of determining a respective first similarity value between one of the plurality of first fragments and a first number of the second fragments; and of stopping to determine the respective first similarity value between the one of the plurality of first fragments and the first number of the second fragments if the respective first similarity value exceeds a given similarity value threshold or if the first number exceeds a number threshold.

Is should also be appreciated that in some examples, the methodology may further include the act of identifying the one of the plurality of first fragments as unmatchable if the determined respective first similarity value between the one of the plurality of first fragments and the first number of the second fragments is at most the given similarity value threshold.

For example, the methodology may further include the acts of determining identical first fragments in the plurality of first fragments and identical second fragments in the plurality of second fragments; and of considering only a given number of maximum allowed repetitions of the identical first or second fragments for the determination of the respective first or second similarity value (S1, S2) and the determination of the respective best-match pair of fragments.

In further examples, if the respective first artifact document and/or the respective second artifact document include(s) a table of artifact information, respectively, the methodology may further include the act of identifying each element of the table of the respective first or second artifact document as a respective first fragment or second fragment, respectively.

Is should also be appreciated that in some examples, if the respective first artifact document and/or the respective second artifact document include(s) a table of artifact information, respectively, the methodology may further include the acts of assigning a respective table identifier to the respective first or second fragments included by the table of the respective first or second artifact document, respectively; and of considering only the first or second fragments with the table identifier for the determination of the respective first or second similarity value and the determination of the respective best-match pair.

For example, if several of the first or second fragments are included by a first or second work item, respectively, the methodology may further include the acts of assigning a respective work item identifier to the respective first or second fragments included by the first or second requirements engineering work item, respectively; and of considering only the first or second fragments with the work item identifier for the determination of the respective first or second similarity value and the determination of the respective best-match pair.

In further examples, if several of the first or second fragments are included by a first or second picture, respectively, the methodology may further include the acts of assigning a respective picture identifier to the respective first or second fragments included by the first or second picture, respectively; and considering only the first or second fragments with the picture identifier for the determination of the respective first or second similarity value and the determination of the respective best-match pair.

FIG. 4 illustrates a block diagram of a data processing system 1000 (also referred to as a computer system) in which an embodiment may be implemented, for example, as a portion of a product system, and/or other system operatively configured by software or otherwise to perform the processes as described herein. The data processing system 1000 may include, for example, the computer or IT system or data processing system 100 mentioned above. The data processing system depicted includes at least one processor 1002 (e.g., a CPU) that may be connected to one or more bridges/controllers/buses 1004 (e.g., a north bridge, a south bridge). One of the buses 1004, for example, may include one or more I/O buses such as a PCI Express bus. Also connected to various buses in the depicted example may include a main memory 1006 (RAM) and a graphics controller 1008. The graphics controller 1008 may be connected to one or more display devices 1010. It should also be noted that in some embodiments one or more controllers (e.g., graphics, south bridge) may be integrated with the CPU (on the same chip or die). Examples of CPU architectures include IA-32, x86-64, and ARM processor architectures.

Other peripherals connected to one or more buses may include communication controllers 1012 (Ethernet controllers, WiFi controllers, cellular controllers) operative to connect to a local area network (LAN), Wide Area Network (WAN), a cellular network, and/or other wired or wireless networks 1014 or communication equipment.

Further components connected to various busses may include one or more I/O controllers 1016 such as USB controllers, Bluetooth controllers, and/or dedicated audio controllers (connected to speakers and/or microphones). It should also be appreciated that various peripherals may be connected to the I/O controller(s) (via various ports and connections) including input devices 1018 (e.g., keyboard, mouse, pointer, touch screen, touch pad, drawing tablet, trackball, buttons, keypad, game controller, gamepad, camera, microphone, scanners, motion sensing devices that capture motion gestures), output devices 1020 (e.g., printers, speakers) or any other type of device that is operative to provide inputs to or receive outputs from the data processing system. Also, it should be appreciated that many devices referred to as input devices or output devices may both provide inputs and receive outputs of communications with the data processing system. For example, the processor 1002 may be integrated into a housing (such as a tablet) that includes a touch screen that serves as both an input and display device. Further, it should be appreciated that some input devices (such as a laptop) may include a plurality of different types of input devices (e.g., touch screen, touch pad, keyboard). Also, it should be appreciated that other peripheral hardware 1022 connected to the I/O controllers 1016 may include any type of device, machine, or component that is configured to communicate with a data processing system.

Additional components connected to various busses may include one or more storage controllers 1024 (e.g., SATA). A storage controller may be connected to a storage device 1026 such as one or more storage drives and/or any associated removable media, that may be any suitable non-transitory machine usable or machine-readable storage medium. Examples include nonvolatile devices, volatile devices, read only devices, writable devices, ROMs, EPROMs, magnetic tape storage, floppy disk drives, hard disk drives, solid-state drives (SSDs), flash memory, optical disk drives (CDs, DVDs, Blu-ray), and other known optical, electrical, or magnetic storage devices drives and/or computer media. Also, in some examples, a storage device such as an SSD may be connected directly to an I/O bus 1004 such as a PCI Express bus.

A data processing system in accordance with an embodiment of the present disclosure may include an operating system 1028, software/firmware 1030, and data stores 1032 (that may be stored on a storage device 1026 and/or the memory 1006). Such an operating system may employ a command line interface (CLI) shell and/or a graphical user interface (GUI) shell. The GUI shell permits multiple display windows to be presented in the graphical user interface simultaneously, with each display window providing an interface to a different application or to a different instance of the same application. A cursor or pointer in the graphical user interface may be manipulated by a user through a pointing device such as a mouse or touch screen. The position of the cursor/pointer may be changed and/or an event, such as clicking a mouse button or touching a touch screen, may be generated to actuate a desired response. Examples of operating systems that may be used in a data processing system may include Microsoft Windows, Linux, UNIX, iOS, and Android operating systems. Also, examples of data stores include data files, data tables, relational database (e.g., Oracle, Microsoft SQL Server), database servers, or any other structure and/or device that is capable of storing data, that is retrievable by a processor.

The communication controllers 1012 may be connected to the network 1014 (not a part of data processing system 1000), that may be any public or private data processing system network or combination of networks, as known to those of skill in the art, including the Internet. Data processing system 1000 may communicate over the network 1014 with one or more other data processing systems such as a server 1034 (also not part of the data processing system 1000). However, an alternative data processing system may correspond to a plurality of data processing systems implemented as part of a distributed system in which processors associated with several data processing systems may be in communication by way of one or more network connections and may collectively perform tasks described as being performed by a single data processing system. Thus, it is to be understood that when referring to a data processing system, such a system may be implemented across several data processing systems organized in a distributed system in communication with each other via a network.

Further, the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely.

In addition, it should be appreciated that data processing systems may be implemented as virtual machines in a virtual machine architecture or cloud environment. For example, the processor 1002 and associated components may correspond to a virtual machine executing in a virtual machine environment of one or more servers. Examples of virtual machine architectures include VMware ESCi, Microsoft Hyper-V, Xen, and KVM.

Those of ordinary skill in the art will appreciate that the hardware depicted for the data processing system may vary for particular implementations. For example, the data processing system 1000 in this example may correspond to a computer, workstation, server, PC, notebook computer, tablet, mobile phone, and/or any other type of apparatus/system that is operative to process data and carry out functionality and features described herein associated with the operation of a data processing system, computer, processor, and/or a controller discussed herein. The depicted example is provided for the purpose of explanation only and is not meant to imply architectural limitations with respect to the present disclosure.

Also, it should be noted that the processor described herein may be located in a server that is remote from the display and input devices described herein. In such an example, the described display device and input device may be included in a client device that communicates with the server (and/or a virtual machine executing on the server) through a wired or wireless network (that may include the Internet). In some embodiments, such a client device, for example, may execute a remote desktop application or may correspond to a portal device that carries out a remote desktop protocol with the server in order to send inputs from an input device to the server and receive visual information from the server to display through a display device. Examples of such remote desktop protocols include Teradici's PCoIP, Microsoft's RDP, and the RFB protocol. In such examples, the processor described herein may correspond to a virtual processor of a virtual machine executing in a physical processor of the server.

As used herein, the terms "component" and "system" are intended to encompass hardware, software, or a combination of hardware and software. Thus, for example, a system or component may be a process, a process executing on a processor, or a processor. Additionally, a component or system may be localized on a single device or distributed across several devices.

Also, as used herein a processor corresponds to any electronic device that is configured via hardware circuits, software, and/or firmware to process data. For example, processors described herein may correspond to one or more (or a combination) of a microprocessor, CPU, FPGA, ASIC, or any other integrated circuit (IC) or other type of circuit that is capable of processing data in a data processing system, that may have the form of a controller board, computer, server, mobile phone, and/or any other type of electronic device.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 1000 may conform to any of the various current implementations and practices known in the art.

Also, it should be understood that the words or phrases used herein should be construed broadly, unless expressly limited in some examples. For example, the terms "comprise" and "comprise," as well as derivatives thereof, mean inclusion without limitation. The singular forms "a", "an" and "the" are intended to include the plural forms as well, unless the context clearly indicates otherwise. Further, the term "and/or" as used herein refers to and encompasses any and all possible combinations of one or more of the associated listed items. The term "or" is inclusive, meaning and/or, unless the context clearly indicates otherwise. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

Also, although the terms "first", "second", "third" and so forth may be used herein to describe various elements, functions, or acts, these elements, functions, or acts should not be limited by these terms. Rather these numeral adjectives are used to distinguish different elements, functions or acts from each other. For example, a first element, function, or act could be termed a second element, function, or act, and, similarly, a second element, function, or act could be termed a first element, function, or act, without departing from the scope of the present disclosure.

In addition, phrases such as "processor is configured to" carry out one or more functions or processes, may mean the processor is operatively configured to or operably configured to carry out the functions or processes via software, firmware, and/or wired circuits. For example, a processor that is configured to carry out a function/process may correspond to a processor that is executing the software/firmware, that is programmed to cause the processor to carry out the function/process and/or may correspond to a processor that has the software/firmware in a memory or storage device that is available to be executed by the processor to carry out the function/process. It should also be noted that a processor that is "configured to" carry out one or more functions or processes, may also correspond to a processor circuit particularly fabricated or "wired" to carry out the functions or processes (e.g., an ASIC or FPGA design). Further the phrase "at least one" before an element (e.g., a processor) that is configured to carry out more than one function may correspond to one or more elements (e.g., processors) that each carry out the functions and may also correspond to two or more of the elements (e.g., processors) that respectively carry out different ones of the one or more different functions.

In addition, the term "adjacent to" may mean: that an element is relatively near to but not in contact with a further element; or that the element is in contact with the further portion, unless the context clearly indicates otherwise.

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present patent document should be read as implying that any particular element, step, act, or function is an essential element, that must be included in the claim scope: the scope of patented subject matter is defined only by the allowed claims.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A computer-implemented method of managing artifact information of at least one first artifact document comprising a plurality of first fragments of artifact information and of at least one second artifact document comprising a plurality of second fragments of artifact information, the method comprising:

generating a graphical user interface (GUI) through a display device, the GUI includes an artifact information management user interface (UI) and GUI elements that allow a user to provide inputs through an input device for managing artifact information;

determining, by a processor, a respective first similarity value between a respective first fragment and a respective second fragment;

determining, by the processor, a respective second similarity value between the respective second fragment and the respective first fragment;

determining, by the processor, a respective best-match pair of fragments among the respective first fragments and the respective second fragments based on the respective first similarity value, the respective second similarity value, or the respective first similarity value and the respective second similarity value;

determining, by the processor, at least one merge action available for merging the respective best-match pair;

displaying, by the processor, the at least one merge action in the artifact information management user interface (UI);

capturing, by the processor, a user's input corresponding to a selection of one of the displayed at least one merge action in response to user interactions with the artifact information management UI;

creating, by the processor, a respective amended first fragment of artifact information by merging the respective best-match pair according to the selected merge action;

determining, by the processor, a respective first similarity value between one of the plurality of first fragments and a first number of the second fragments; and stopping, by the processor, to determine the respective first similarity value between the one of the plurality of first fragments and the first number of the second fragments if the respective first similarity value exceeds a given similarity value threshold or if the first number exceeds a number threshold.

2. The computer-implemented method of claim 1, further comprising:

identifying, by the processor, the respective pair of artifact fragments as the respective best-match pair when the respective first similarity value or the respective second similarity value exceeds a given similarity value threshold, respectively.

3. The computer-implemented method of claim 1, further comprising:

determining, by the processor, a respective first similarity value between one of the plurality of first fragments and a first number of the second fragments until the respective first similarity value exceeds a given similarity value threshold;

determining, by the processor, the respective first number of second fragments;

identifying, by the processor, the respective pair of fragments with the respective first similarity value exceeding the given similarity value threshold as a respective first-match pair of fragments; and determining, by the processor, a respective second similarity value between the second fragment of the first-match pair and a second number of the first fragments.

4. The computer-implemented method of claim 3, further comprising:

determining, by the processor, the respective second similarity value between the second fragment of the first-match pair and the second number of the first fragments until the respective second similarity value exceeds a given similarity value threshold; and identifying, by the processor, the pair of fragments with the respective second similarity value exceeding the given similarity value threshold as the best-match pair of fragments.

5. The computer-implemented method of claim 4, further comprising:

setting, by the processor, the second number to be equal to the first number; and/or stopping, by the processor, to determining the respective first similarity value or the respective second similarity value if the first number and/or the second number exceed(s) a number threshold, respectively.

6. The computer-implemented method of claim 3, further comprising:

identifying, by the processor, the one of the plurality of first fragments as unmatchable if the determined respective first similarity value between the one of the plurality of first fragments and the first number of the second fragments is at most the given similarity value threshold.

7. The computer-implemented method of claim 1, wherein for the determination of the respective first similarity value and/or the respective second similarity value, only first fragments and/or second fragments are considered which are not comprised by best-match pairs of fragments and/or which are not identified as unmatchable.

8. The computer-implemented method of claim 1, further comprising:

determining, by the processor, identical first fragments in the plurality of first fragments and identical second fragments in the plurality of second fragments; and considering, by the processor, only a given number of maximum allowed repetitions of the identical first or second fragments for the determination of the respective first or second similarity value and the determination of the respective best-match pair of fragments.

9. The computer-implemented method of claim 1, further comprising, when the respective first artifact document and/or the respective second artifact document comprise(s) a table of artifact information, respectively:

assigning, by the processor, a respective table identifier to the respective first or second fragments comprised by the table of the respective first or second artifact document, respectively; and considering, by the processor, only the first or second fragments with the table identifier for the determination of the respective first or second similarity value and the determination of the respective best-match pair.

10. The computer-implemented method of claim 1, further comprising, if several of the first or second fragments are comprised by a first or second work item, respectively:

assigning, by the processor, a respective work item identifier to the respective first or second fragments comprised by the first or second requirements engineering work item, respectively;

considering, by the processor, only the first or second fragments with the work item identifier for the determination of the respective first or second similarity value and the determination of the respective best-match pair.

11. The computer-implemented method of claim 1, further comprising, if several of the first or second fragments are comprised by a first or second picture, respectively:

assigning, by the processor, a respective picture identifier to the respective first or second fragments comprised by the first or second picture, respectively; and considering, by the processor, only the first or second fragments with the picture identifier for the determination of the respective first or second similarity value and the determination of the respective best-match pair.

12. A non-transitory computer readable storage medium comprising a set of computer-readable instructions stored thereon for managing artifact information of at least one first artifact document comprising a plurality of first fragments of artifact information and of at least one second artifact document comprising a plurality of second fragments of artifact information, the instructions which, when executed by at least one processor cause the processor to:
generate a graphical user interface (GUI) through a display device, the GUI includes an artifact information management user interface (UI) and GUI elements that allow a user to provide inputs through an input device for managing artifact information;
determine a respective first similarity value between a respective first fragment and a respective second fragment;
determine a respective second similarity value between the respective second fragment and the respective first fragment;
determine a respective best-match pair of fragments among the respective first fragments and the respective second fragments based on the respective first similarity value, the respective second similarity value, or the respective first similarity value and the respective second similarity value;
determine at least one merge action available for merging the respective best-match pair;
display the at least one merge action in the artifact information management user interface (UI);
capture a user's input corresponding to a selection of one of the displayed at least one merge action in response to user interactions with the artifact information management UI;
create a respective amended first fragment of artifact information by merging the respective best-match pair according to the selected merge action;
determine the respective first similarity value between one of the plurality of first fragments and a first number of the second fragments; and
stop to determine the respective first similarity value between the one of the plurality of first fragments and the first number of the second fragments if the respective first similarity value exceeds a given similarity value threshold or if the first number exceeds a number threshold.

13. The non-transitory computer readable storage medium of claim 12, further comprising instructions to:
identify the respective pair of artifact fragments as the respective best-match pair when the respective first similarity value or the respective second similarity value exceeds a given similarity value threshold, respectively.

14. The non-transitory computer readable storage medium of claim 12, further comprising instructions to:
determine a respective first similarity value between one of the plurality of first fragments and a first number of the second fragments until the respective first similarity value exceeds a given similarity value threshold;
determine the respective first number of second fragments;
identifying the respective pair of fragments with the respective first similarity value exceeding the given similarity value threshold as a respective first-match pair of fragments; and
determine a respective second similarity value between the second fragment of the first-match pair and a second number of the first fragments.

15. The non-transitory computer readable storage medium of claim 14, further comprising instructions to:
determine the respective second similarity value between the second fragment of the first-match pair and the second number of the first fragments until the respective second similarity value exceeds a given similarity value threshold; and
identify the pair of fragments with the respective second similarity value exceeding the given similarity value threshold as the best-match pair of fragments.

16. The non-transitory computer readable storage medium of claim 15, further comprising instructions to:
set the second number to be equal to the first number; and/or
stop to determining the respective first similarity value or the respective second similarity value if the first number and/or the second number exceed(s) a number threshold, respectively.

17. The non-transitory computer readable storage medium of claim 14, further comprising instructions to:
identify the one of the plurality of first fragments as unmatchable if the determined respective first similarity value between the one of the plurality of first fragments and the first number of the second fragments is at most the given similarity value threshold.

18. The non-transitory computer readable storage medium of claim 12, wherein for the determination of the respective first similarity value and/or the respective second similarity value, only first fragments and/or second fragments are considered which are not comprised by best-match pairs of fragments and/or which are not identified as unmatchable.

* * * * *